June 5, 1956  J. W. GRAY  2,749,035
HOMING NAVIGATOR
Filed Aug. 15, 1950  3 Sheets-Sheet 1

Fig. 1

Inventor
JOHN W. GRAY
By
H. S. Mackey
Attorney

Fig 2A

United States Patent Office 2,749,035
Patented June 5, 1956

2,749,035
HOMING NAVIGATOR

John W. Gray, White Plains, N. Y., assignor to General Precision Laboratory Incorporated, a corporation of New York Application August 15, 1950, Serial No. 179,452

13 Claims. (Cl. 235—61)

This invention pertains to homing navigators and more particularly to a mechanism for the automatic guidance of any piloted craft to any point on the surface of the earth. Furthermore, since the output indication of this invention can be adapted to the actuation of an automatic pilot, application can be made also to pilotless craft.

The homing navigator is an analog computer which solves a set of trigonometric equations representing relations in a spherical triangle drawn on the surface of the earth between a pole of the earth, the initial point and the destination. In so doing, the computer accomplishes a dead reckoning operation based on the latitudes and longitudes of the starting and destination points on the surface of the earth and on a continuous reception of north direction, continuously evolving information enabling a great circle course to be steered to the destination. This function is accomplished with relatively few simple devices, and with accuracy which increases as the target or destination is neared. If, in a piloted craft, a willful deviation be made from the planned course, the instrument embodying the invention automatically selects a new, shortest, great circle path to the destination and thereafter produces indications guiding the pilot along the new path.

This system is applicable for use in the global navigation of marine craft, aircraft and any other type of vehicle.

In use of this system the latitude and longitude of the objective, the course angle at the objective, and the distance to the objective are set in as initial input data. During the journey, heading angle, drift angle, and speed data must be supplied continuously, and the equipment of the invention computes therefrom the distance remaining to be traveled, present latitude and longitude of the craft, and the course error. The latter is displayed on an instrument termed a pilot direction indicator which indicates zero when the craft is on the correct course and right error or left error if the heading of the craft is in error to the right or left.

This pilot direction indication is actually all that is essential in order to reach the planned destination, it not being necessary to be kept informed of the present latitude and longitude. Therefore that portion of the equipment necessary for the production of pilot direction indication and remaining distance to destination can be used alone, and the remainder of the equipment useful solely to compute present latitude and longitude can be omitted without impairing the essential primary function of the device.

The method of operation of this computer involves resolving the speed of the craft along its actual ground track into two mutually perpendicular components, one along the computed ground track of the great circle to destination, and the second at right angles thereto. Integration of the first gives the distance traveled in the direction of the destination and subtraction of this distance from the initial distance gives the distance remaining to be traveled, which is displayed on a dial. Integration of the right angle component leads to a corrected value for the course to be traveled to destination and this, subtracted from the ground track course actually being traveled as secured from compass and other data, results in the pilot direction indicator display of the course error. Additional automatic computation based on these output data results in the display on counters or dials of the present latitude and longitude of the craft.

A purpose of the invention therefore, is to provide a mechanism whereby the known factors of departure point, destination point, speed, drift and compass heading may be utilized to indicate any deviation from a great circle course between the point of departure and the point of destination and in the event that such deviation occurs intentionally or accidentally to compute a new great circle course from the position of the vehicle to the destination and to indicate any deviation from such newly computed course.

Another purpose of the invention is to provide additional mechanism so that the present latitude and longitude of the vehicle is indicated at all times regardless of the course followed.

A more detailed understanding of this invention may be had from the following description and the drawing, in which.

Figure 1:
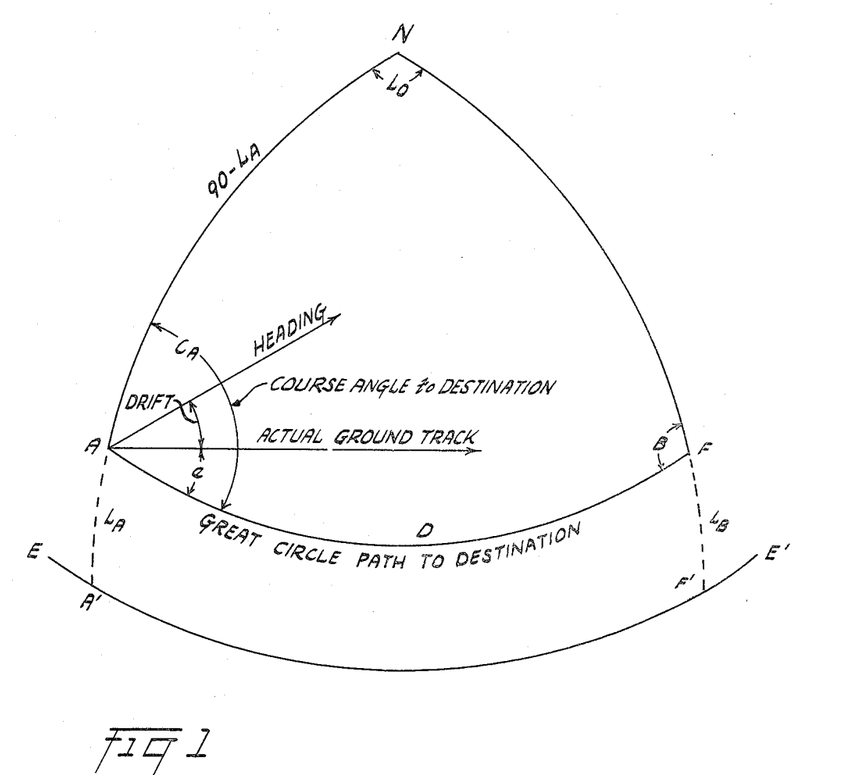
Fig. 1 depicts a spherical triangle illustrating the navigational problem.

Referring to Fig. 1, N represents the North Pole of the earth and two other points, A and F, are connected therewith and with each other by sections of great circles to form a spherical triangle. A represents the starting point of a journey and F its terminal point. The length of path of the journey along the shortest or great circle route is termed D, the course angle at F is termed B and that at A, which is course angle to destination, is termed $C_A$. The latitude of A, or the distance in degrees to the equator EE' is termed $L_A$ and that of F is termed $L_B$. The difference in longitude between A and F is the angle Lo at the Pole N. Although the spherical triangle of Fig. 1 is drawn to represent a great circle path to destination lying wholly in the northern hemisphere of the earth, and nearly parallel to the equator, the equations about to be derived are general and the relations derived from them are algebraic, so that they and the computer are equally applicable to any path on the surface of the earth in either or both hemispheres, going in any direction and of any length.

By applying the laws of sines and cosines for spherical triangles to the triangle of Fig. 1, there are obtained the relations embodied in these six equations:

$$\cos L_A \cos C_A = \sin L_B \sin D - \cos D \cos L_B \cos B \quad (1)$$
$$\cos L_A \sin C_A = \cos L_B \sin B \quad (2)$$
$$\cos L_A \cos Lo = \cos D \cos L_B - \sin D \sin L_B \cos B \quad (3)$$
$$\cos L_A \sin Lo = \sin D \sin B \quad (4)$$
$$\cos L_A = \sqrt{(\cos D \cos L_B - \sin D \sin L_B \cos B)^2 + (\sin D \sin B)^2} \quad (5)$$
$$\sin L_A = \cos D \sin L_B + \sin D \cos B \cos L_B \quad (6)$$

Dividing the first equation by the second, the third by the fourth, and the fifth by the sixth, three composite equations result as follows:

$$\frac{\cos L_A \cos C_A}{\cos L_A \sin C_A} = \frac{\sin L_B \sin D - \cos D \cos L_B \cos B}{\cos L_B \sin B} \quad (7)$$

$$\frac{\cos L_A \cos Lo}{\cos L_A \sin Lo} = \frac{\cos D \cos L_B - \sin D \sin L_B \cos B}{\sin D \sin B} \quad (8)$$

$$\frac{\cos L_A}{\sin L_A} = \frac{\sqrt{(\cos D \cos L_B - \sin D \sin L_B \cos B)^2 - (\sin D \sin B)^2}}{\cos D \sin L_B + \sin D \cos B \cos L_B} \quad (9)$$

Figure 2A:
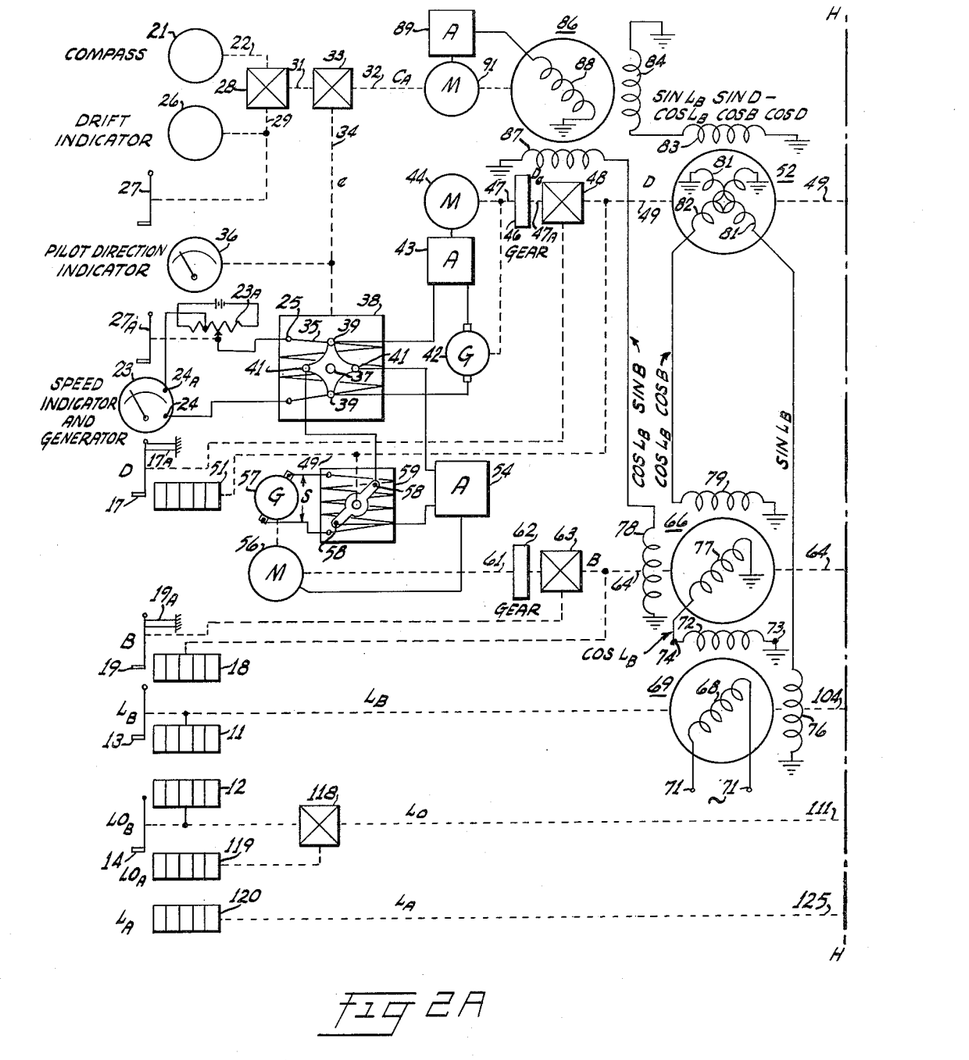
Figs. 2A and 2B when joined together at the line H—H constitute a schematic diagram of the navigator of the invention.
Figure 2B:
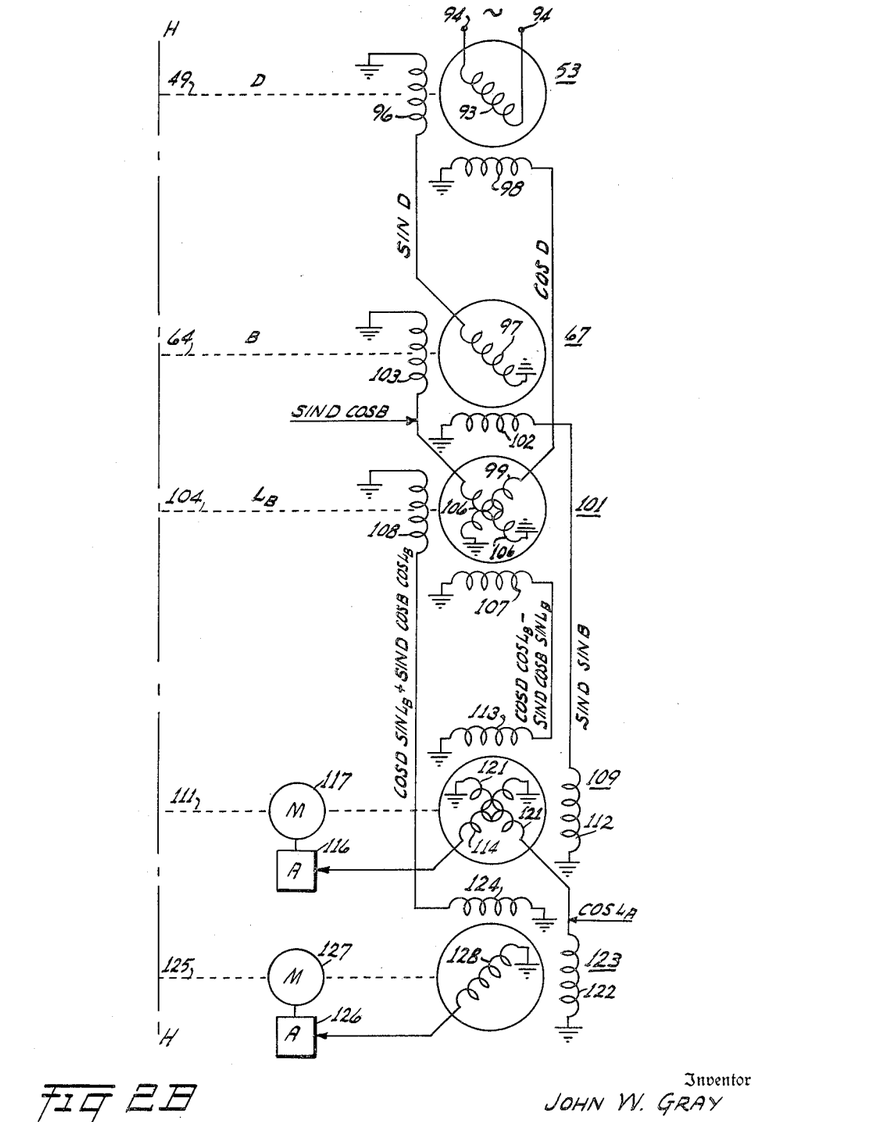

Basically, the homing navigator consists of the instrumentation for the solution of these three equations, a preferable embodiment of which is disclosed in the schematic diagram of Figs. 2A and 2B.

Let it be supposed that Fig. 1 depicts the projected route of an ocean vessel from one point A to another point F in the northern hemisphere over a great circle path to destination. The length of this projected path initially or at any time during the voyage is termed D. Since the latitudes of both A and F are known, the initial D can be calculated.

In Fig. 2A input values are set on counters by means of handwheels. The latitude, $L_B$, of F and its longitude, $Lo_B$, are set on counters by means of handwheels. The latitude, $L_B$, of F and its longitude, $Lo_B$, are set on counters 11 and 12 by handwheels 13 and 14 respectively. Similarly the initial value of D, the distance to destination, is set on counter 51 by the handwheel 17, and similarly the initial value of the angle B is set on the counter 18 by means of the handwheel 19. Both of these handwheels contain friction elements, represented by the pads 17A and 19A, so that they can rotate their respective shafts but cannot be driven by their shafts.

Thus values representing known data in the spherical triangle of Fig. 1 are entered in the homing navigator mechanism schematically represented in Fig. 2A. There remain only two additional data to be entered. These are running data on the course and speed of the craft during the progress of the journey, from which the computer continuously calculates the course error and the present position of the craft.

These running data are received from a compass, drift adjustment, and speed metering equipment. The compass 21 is of the magnetic type corrected for magnetic declination and having a take-off of any well known form which without affecting accuracy, delivers an indication of the heading angle of the vessel with respect to true north as an angular displacement of a shaft 22. The speed in the headed direction is obtained by means of a propeller shaft tachometer 23, which indicates the speed and also generates a direct current voltage proportional thereto across terminals 24—24A. The drift caused by ocean currents is found from nautical tables, and from it and the speed, is calculated the drift angle between the heading and the actual ground track. This angle is set on the center-zero drift indicator 26 by means of the handwheel 27. From the drift and the tachometer speed there is similarly calculated the correction to be made to the tachometer speed to correct it to ground track speed. This correction is inserted by means of a handwheel 27A controlling a voltage divider 23A to insert a voltage in series with the direct-current voltage output of the speed indicator 23. The algebraic sum of these series voltages is a direct-current voltage at the terminals 25—25A which is used by the computer as input data.

The actual ground track will coincide with the great circle path to destination if the steering is perfect and the ship's head is not caused to yaw off course by the seas, but in practice there is always a steering error which may be either to starboard or to port and which changes from minute to minute. In addition, it may be desired to change the course to go around an obstacle, or stoppage of the engines for a time will cause the course to be a drifting one until headway is resumed. Therefore, in general the actual ground track is different from the great circle path to destination and in addition the latter path may change during the course of the voyage. The homing navigator permits such a change, which is to say that it "forgets" the initial values of D, $C_A$ and B, and all past values thereof, and at any instant based upon the initial data and the record of the voyage develops currently correct values for D, $C_A$ and B.

The several course angles and paths are illustrated in Fig. 1. The course angle to destination at A is termed $C_A$ and the angular deviation from this course caused by steering error or any other cause is termed $e$, the resulting path being termed actual ground track. The sum of the heading angle and drift angle is the actual ground track azimuth angle. The heading and drift angles are therefore added in the homing navigator by means of a mechanical differential 28, Fig. 2A, which is actuated by the compass 21 and the drift handwheel 27 through shafts 22 and 29 respectively. The output representing the actual ground track azimuth angle appears on shaft 31.

The course angle to destination $C_A$, is represented by the angular displacement of a shaft 32 actuated in a manner to be described later. This shaft displacement is subtracted from the displacement of the shaft 31 representing actual ground track azimuth angle by a differential 33, so that its output, the displacement of shaft 34, represents the angular deviation $e$ from the great circle course. This quantity is indicated on a center-zero indicator 36, actuated by shaft 34, which is termed a pilot direction indicator. This indicator presents to the steersman a simple steering guide, it being necessary for him merely to steer the ship so as to maintain the pilot direction indicator on zero or as near thereto as possible. As the vessel progresses along its course the course angle $C_A$ changes as is obvious from Fig. 1, but this need not be recognized by the steersman, whose method of steering continues to be as described because the homing navigator automatically and continuously amends its indications accordingly.

The distance remaining to be traveled also of course, continuously decreases, and this value, termed D, is computed by integration of the speed, corrected for course error, in the following manner. The course error $e$, represented by the angular deflection of the shaft 34, rotates the rotor 37 of a sine-cosine potentiometer 38. The winding 35 of this potentiometer is energized by the corrected potential $v$ across terminals 24—25 representing speed along the actual ground track, so that the resulting potential across the potentiometer rotor terminals 39—39 is $v$ multiplied by the cosine of $e$ while the potential across the terminals 41—41 is $v$ multiplied by the sine of $e$. The potential $v \cos e$ appearing at the terminals 39—39 is integrated in a common form of integrator comprising an electrical direct-current generator 42, high gain amplifier 43, and motor 44. The generator and amplifier input terminals are in series with the input terminals 39—39, the amplified signal actuates the motor, and the motor shaft furnishes the output signal while its rotation is also fed back to rotate the generator. The generator output terminals are connected to oppose the input signal so that the whole constitutes a negative feedback loop, and the motor shaft displacement is proportional to the integrated corrected speed signal; that is:

$$D_e = k \int v \cos e \, dt \qquad (10)$$

in which $D_e$ represents the elapsed distance traveled in a direction toward the destination and $k$ is the constant of proportionality. The constant $k$ is represented by the gear box 46 in the output shaft 47 of the integrator. From the gear box this shaft enters a differential 48, where the elapsed distance $D_e$ is subtracted from the initial distance $D_0$ set in by the handwheel 17, the difference D appearing on the shaft 49. That is:

$$D_0 - D_e = D \qquad (11)$$

Since D is the difference between the initial distance and the traveled distance, it is the great circle distance remaining to be traveled. This useful information is therefore displayed on a counter 51 and also is used to rotate the rotors of two synchros 52 and 53, Fig. 2B, employed in the solutions of Equations 7, 8 and 9, as will be described later.

The fact that the computer "forgets" the initial setting of D, which is to say in mechanical terms that the shaft 47A drives straight through to shaft 49, the handwheel 17 being effectively locked, distinguishes this computer from others, and makes the "distance to go," D, the correct great circle distance regardless of any excursions that have been made upon any other course whatever.

The potential at the terminals 41—41 of the sine potentiometer, which is proportional to voltage times the sine of $e$, is applied to a second integrator composed of the amplifier 54, motor 56, generator 57 and sine potentiometer 59. These components are connected to form a servomechanism. The generator output $s$ supplies the sine potentiometer terminals and the quantity D carried by the shaft 49 rotates the sine potentiometer shaft. The potentiometer output terminals 58 therefore develop the potential $s \sin D$. This output potential is applied to the amplifier 54 in series with the potential of the terminals 41 of the first sine potentiometer, equating these potentials at balance. That is:

$$s \sin D = v \sin e \qquad (12)$$

or $$s = \frac{v \sin e}{\sin D} \qquad (13)$$

Let the output displacement of the motor shaft 61 be termed M, then since the components are connected as a servomechanism, $$M \propto \int s\, dt \qquad (14)$$

$$M = k_1 \int \frac{v \sin e}{\sin d} dt \qquad (15)$$

where $k_1$ is a proportionality constant, M represents the change in the angle B caused by the steering error or by any other departure from the planned course, however originated. The constant $k_1$ is represented by the gear box 62. The corrected value of the angle B is the algebraic sum of $B_o$ and $B_e$, where $B_o$ is the initial value of B, and $B_e$ is the elapsed change thereof, or $$B = B_o + B_e \qquad (16)$$

and this operation of addition is performed continuously by a differential 63. The angular deflection of the output shaft 64 is employed to position the rotors of two synchros 66 and 67 in the solution of the Equations 7, 8 and 9. These equations are instrumented in the homing navigator in the following manner.

When the latitude $L_B$ of the destination F is set in by the handwheel 13 it positions the rotor winding 68 of a synchro or resolver 69 to the angle representative of the latitude. This synchro 69 is of the well-known type having a rotor with a single winding and two stator windings separated by 90° in space around the axis of rotor motion. Alternating current potential of any convenient frequency such as 400 cycles per second is supplied to the terminals 71—71 of the rotor with the result that synchronous and single-phase potential of 400 C. P. S. may be secured from each field winding with a relative magnitude of potential compared to that of the input proportional to the sine or cosine of the angular position of the rotor. In the synchro 69, with alternating potential supplied to the terminals 71—71, the polarities and displacements are so arranged that the stator winding 72 has a potential induced across its two terminals 73—74 of $v \cos L_B$, in which $v$ is the induced potential when the angle $L_B$ is zero. For brevity in describing instrumentation, the "$v$" will be disregarded here and in the following descriptions, as it enters the Equations 7, 8 and 9 simply as a constant of proportionality and has been disregarded in writing them. The potential across the terminals 73—74 will therefore be regarded as having the value $\cos L_B$. Similarly, the potential induced in the second stator winding 76 is termed $\sin L_B$.

If these potentials are to be used in an accurate computer they are preferably sensed by some means which imposes no current drain whatever and therefore puts no load on the stator windings within which they are induced, and so does not reduce the sensed magnitudes of the induced potentials. This is easily done by known techniques employing high input impedance amplifiers. Since the instant invention is operable without such amplifiers with only the incurrence of a penalty of reduced accuracy, such amplifiers will be omitted from this description. For convenience single-wire transmission is indicated in the schematic figure, with each circuit carrying induced potentials completed through earthed terminals.

As before described, the displacement of the shaft 64 is proportional at any instant to the present value of the angle B, Fig. 1. This angular displacement is caused to position the rotor winding 77 of a synchro 66 which is exactly like the synchro 69, but instead of its rotor winding 77 being supplied with potential directly from the power source, the potential supplied is representative of $\cos L_B$, since it is derived from the winding 72 of the synchro 69 so that the potentials induced in the stator windings 78 and 79 represent this supplied potential times the sine or cosine of B, or $\cos L_B \sin B$ and $\cos L_B \cos B$ respectively.

As before mentioned, the rotor of the synchro 52 is positioned by the shaft 49 at an angle representative at all times of the present magnitude of the distance D remaining to be traveled. In this synchro 52 the rotor carries a pair of windings 81 and 82 displaced by 90° while a single winding 83 is on the stator. Rotor and stator windings can of course, be interchanged in this or any of the other synchros without affecting their computing functions. The rotor winding 81 energized in accordance with $\sin L_B$ from the stator winding 76 of the synchro 69 induces in the single stator winding 83 this potential $\sin L_B$ multiplied by $\sin D$, or $\sin L_B \sin D$. Similarly the rotor winding 82 is energized by $\cos L_B \cos B$ derived from the stator winding 79 of the synchro 66 and in inducing a potential in the stator winding multiplies the energizing potential by $\cos D$, so that the induced potential in the stator winding caused by winding 82 is $\cos L_B \cos B \cos D$. Thus two potentials are simultaneously induced in the one stator winding 83, and because they are in phase they will either add or subtract depending on the relative polarities of connection of the rotor windings and the quadrant of the rotor angle D. In this case the construction is made to subtract the quantities algebraically, so that the output quantity is proportional to: $\sin L_B \sin D - \cos L_B \cos B \cos D$.

This quantity is fed into one stator winding 84 of a synchro 86 which is mechanically similar to the resolver synchros 66 and 69 but which functions differently. Its second stator winding 87 is energized by potential derived from synchro 66 representing $\cos L_B \sin B$, and its rotor winding 88 energizes the input terminals of an amplifier 89. The output energy of this amplifier actuates a gear motor 91 whose shaft rotates the rotor winding 88 in a direction to bring the rotor potential toward zero value. The motor shaft displacement also constitutes the output quantity, having a value $C_A$ and causing the shaft 32 to assume an angular displacement of that amount in the following manner.

When the servo action of the gear motor 91 has brought the rotor winding 88 to an angle $\phi$ at which the effects of the two stator fields cancel each other, the resolved components of the two fields in the direction $\phi$ must be equal, and one must be in proportion to the sine of $\phi$ while the other is proportional to the cosine of $\phi$: that is, $$E_1 \sin \phi - E_2 \cos \phi = 0 \qquad (17)$$

where $E_1$ is the potential supplied to the stator 84 and $E_2$ is the potential supplied to the stator 87. This is equivalent to $$\frac{E_1}{E_2} = \frac{\cos \phi}{\sin \phi} \qquad (18)$$

The potential $E_1$ supplied to the stator 84, however, has a value proportional to $\sin L_B \sin D - \cos L_B \cos B \cos D$ while the potential $E_2$ supplied to the stator 87 has a value $\cos L_B \sin B$ as has been explained heretofore. Thus Equation 18 may be rewritten as $$\frac{\cos \phi}{\sin \phi} = \frac{\sin L_B \sin D - \cos L_B \cos B \cos D}{\cos L_B \sin B} \quad (19)$$

Substituting the equivalent expression of Equation 19 in Equation 7 and simplifying, the following expression is obtained:

$$\frac{\cos \phi}{\sin \phi} = \frac{\cos C_A}{\sin C_A} \quad (20)$$

Thus the angle $\phi$ of the shaft 32 is equivalent to $C_A$.

The synchro 86 with its associated devices thus may be termed an arc-tangent computer since in solving the Equation 7 it performs the division indicated by the right-hand term, generates $\cos L_A$ and $\sin L_A$, equates the right and left sides of the equation, and solves for $C_A$.

The homing navigator as thus far described, therefore computes the distance remaining to be traveled and the course angle, displaying the distance on a counter 51 and the course angle as a course angle error on an indicator 36 for the convenience of the helmsman. These are useful results and sufficient for some navigational purposes, so that the homing navigator as so far described, has utility in and of itself without more and in fact the included counter 12 and $Lo_B$ input handwheel 14 are not actually essential to these functions.

In Fig. 2B the shafts 49, 64, 104, 111 and 125 are the same respectively, as the like-numbered shafts of Fig. 2A, and are so positioned that when Figs. 2A and 2B are adjoined, the shafts of one figure are to be considered as aligned with the shafts of the other.

As before mentioned, the synchro 53 is positioned by the shaft 49 representing the distance D remaining to be traveled. This is a resolving synchro similar to synchro 69 and like it has a rotor winding 93 actuated by an alternating current potential source at the terminals 94—94. The stator windings therefore, have induced in them potentials $v \sin D$ and $v \cos D$. As previously described, the constant $v$ may be neglected and the potential output of the stator 96 representative of $\sin D$ is transmitted to the rotor 97 of a synchro 67, while the potential output of the stator 98 representative of $\cos D$ is transmitted to one rotor winding 99 of a synchro 101.

The synchro 67 is positioned by the shaft 64 representing the angle B, as before mentioned. The synchro 67 being a resolving synchro with its rotor supplied with a potential $\sin D$, its stators 102 and 103 have induced in them potentials representing $\sin D \sin B$ and $\sin D \cos B$ respectively.

The synchro 101 is positioned by the shaft 104 representing $L_B$. This synchro has two rotor windings 99 and 106, and two stator windings 107 and 108. Just as in the case of the synchro 52, the effect on each stator winding is the algebraic sum or difference of the resolved effects of each rotor winding on it; when this effect on one stator winding is the sum, that on the other is the difference, and vice versa. Connections are so poled that the potential induced in the stator winding 107 is $\cos D \cos L_B - \sin D \cos B \sin L_B$, while that induced in the stator winding 108 is $\cos D \sin L_B + \sin D \cos L_B \cos B$.

The synchro 109 is similar to the synchro 86 in that its inputs are to two stator windings 112 and 113 and in that a rotor winding 114 actuates a servomechanism including an amplifier 116, motor 117 and motor shaft which is connected in a degenerative sense to the rotor to bring it to an angle at which the voltage generated in the rotor winding 114 is zero. In the same manner as described for the synchro 86, the synchro 109 performs the division indicated by the right-hand side of Equation 8, computes $\cos Lo$ and $\sin Lo$, and divides them to solve Equation 8 in terms of $Lo$ which it delivers as a rotational displacement of its shaft 111.

That is to say, since the input impressed on the stator 113 is equivalent to $\cos D \cos L_B - \sin D \cos B \sin L_B$ and the input impressed on the stator 112 is equivalent to $\sin D \sin B$, the shaft 111 by the servo action of the motor 117 is positioned at such an angle $\theta$ that $$\frac{\cos \theta}{\sin \theta} = \frac{\cos D \cos L_B - \sin D \sin L_B \cos B}{\sin D \sin B} \quad (21)$$

It will be recognized that the right hand expression of Equation 21 is identical to the right hand expression of Equation 8 so that $$\frac{\cos \theta}{\sin \theta} = \frac{\cos Lo}{\sin Lo} \quad (22)$$

and $$\theta = Lo \quad (23)$$

This displacement angle is supplied to one input shaft of a differential 118, the other input shaft of which is positioned by the input data handwheel $Lo_B$. The addition of these two angles is performed by the differential 118 and the sum, which is the longitude $Lo_A$ of the point A, or during the journey the longitude of the vessel at any time, is displayed on the counter 119.

The synchro 109 is different from the synchro 86, however, in having an additional winding 121 on the rotor. Because this winding is spatially at right angles to the servoing rotor winding, when the latter is brought to zero potential by servo action the former has the maximum potential induced in it, equal to $$E_1 \sin Lo + E_2 \cos Lo \quad (24)$$

This is tantamount to the quadrature addition of $E_1$ and $E_2$ representing the stator excitations, adding them as if they were vectors making a right angle with each other. The same numerical result is attained by taking the square root of the sum of the squares of $E_1$ and $E_2$ and the output potential P of the winding 121 can therefore be regarded, numerically, as $$P = \sqrt{E_1^2 + E_2^2} \quad (25)$$

But if $E_1$ is the input to winding 113 and equals $\cos D \cos L_B - \sin D \cos B \sin L_B$, and if $E_2$ is the input to winding 112 and equals $\sin D \sin B$, the "vector sum" P is expressed by $$P = \sqrt{(\cos D \cos L_B - \sin D \cos B \sin L_B)^2 + (\sin D \sin B)^2} \quad (26)$$

This quantity is the same as the numerator of the right-hand side of Equation 9; it is applied to the stator winding 122 of the synchro 123.

The quantity $\cos D \sin L_B + \sin D \cos B \cos L_B$ generated in the winding 108 of synchro 101 is employed to energize the winding 124 of the synchro 123, and is the same as the denominator of the right-hand side of Equation 9. The synchro 123 forms with the amplifier 126 and motor 127 a servomechanism which servoes the rotor winding 128 until the potential across it is zero, at which time the motor shaft displacement angle is $L_A$ in accordance with Equation 9. The operation of this synchro 123 as part of an arc-tangent computer servomechanism is similar to that of the synchros 86 and 109 and therefore the description of its operation will not be enlarged upon other than to say that the shaft 125 is positioned at such an angle $\Delta$ that $$\frac{\cos \Delta}{\sin \Delta} = \frac{\sqrt{(\cos D \cos L_B - \sin D \sin L_B \cos B)^2 + (\sin D \sin B)^2}}{\cos D \sin L_B + \sin D \cos B \cos L_B} \quad (27)$$

and hence substituting in Equation 9

$$\frac{\cos \Delta}{\sin \Delta} = \frac{\cos L_A}{\sin L_A} \quad (28)$$

or the angle Δ is equivalent to L_A. The motor shaft 125 of synchro 123 is connected to a counter 120 on which is displayed the latitude L_A of the point A and of the vessel at any time during the journey.

In this description the angle e has been described as the steering error angle; it can occur through inadvertence or it can be an angle of departure wilfully steered from the planned course. No difference in the described operation of the homing navigator will ensue in either case and after any such deviation, even if extensive, it is only necessary for the helmsman to change course until the pilot direction indicator 36 indicates zero, when the vessel will be on a new great circle course to its destination F.

While preferred components have been specified in the example embodying this invention, other equivalent components may be substituted without changing the ultimate results obtained. For example, those skilled in the art will recognize that with appropriate changes in accessories, a synchro resolver can be used in place of the sine potentiometer resolver 38 or 59, ball disc integrators may be used rather than the motor generator integrators 42/44 and 57/56, and sine condensers or sine potentiometers may be used for any or all of the synchros specifically disclosed and described, the specific components used being described and illustrated in a representative rather than a limiting sense.

What is claimed is:

1. A navigator for continuously indicating the proper heading of a vehicle in traversing a great circle course over the earth's surface from a known point of departure to a known point of destination comprising, speed entering means, a first integrator for integrating a function of the speed entered by said speed entering means, distance entering means for entering the calculated great circle distance between said known point of departure and said known point of destination, subtractive means operative by the output of said first integrator and said distance entering means producing an output indicative of distance remaining to be traveled, a second integrator for integrating a function of said distance remaining to be traveled, course angle entering means for entering the calculated initial course angle at the point of destination, summation means operated by said course angle entering means and the output of said second integrator producing an output indicative of the course angle at the point of destination based on present vehicle position, latitude of destination entering means, trigonometric calculating means operative by said latitude of destination entering means, said distance remaining to be traveled output and said course angle based on present vehicle position output to produce a calculated output representative of course angle at present vehicle position, compass heading entering means, drift entering means, algebraic summation means operated by said compass heading entering means, said drift entering means and the output of said trigonometric calculating means, an indicator actuated by the output of said algebraic summation means, and means for deriving trigonometric functions of said algebraic summation means inserted between the output thereof and the inputs of said first and second integrators.

2. A navigator for continuously indicating the proper heading of a vehicle in traversing a great circle course over the earth's surface from a known point of departure to a known point of destination comprising, speed entering means, a first integrator for integrating a function of the speed entered by said speed entering means, distance entering means for entering the calculated great circle distance between said known point of departure and said known point of destination, subtractive means operative by the output of said first integrator and said distance entering means producing an output indicative of the distance remaining to be traveled, an indicator operated thereby, a second integrator including a feedback circuit, means for impressing a function of said speed entering means on the input thereof and means for impressing a trigonometric function of the output of said subtractive means in the feedback circuit whereby the output of said second integrator is the integral of the quotient of said functions, course angle entering means for entering the calculated initial course angle at the point of destination, summation means operative by said course angle entering means and the output of said second integrator producing an output indicative of the course angle at the point of destination based on present vehicle position, latitude of destination entering means, trigonometric calculating means operative by said latitude of destination entering means, said distance remaining to be traveled output and said course angle at destination based on present vehicle position output to produce an output representative of course angle at present vehicle position, compass heading entering means, drift entering means, algebraic summation means operated by said compass heading entering means, said drift entering means and the output of said trigonometric calculating means, an indicator actuated by the output of said algebraic summation means and trigonometric function deriving means inserted between said speed entering means and said first and second integrators operated by the output of said algebraic summation means.

3. A navigator for continuously indicating the proper heading of a vehicle in traversing a great circle course over the earth's surface from a known point of departure to a known point of destination comprising, speed entering means, a first integrator for integrating a function of the speed entered by said speed entering means, distance entering means for entering the calculated great circle distance between said known point of departure and said known point of destination, subtractive means operative by the output of said first integrator and said distance entering means producing an output indicative of the distance remaining to be traveled, an indicator operated thereby, a second integrator including a feedback circuit, means for impressing a function of said speed entering means for impressing on the input thereof and means for impressing a function of the output of said subtractive means in said feedback circuit whereby the output of said second integrator is the integral of the quotient of said last mentioned functions, course angle entering means for entering the calculated initial course angle at the point of destination, summation means operative by said course angle entering means and the output of said second integrator producing an output indicative of the course angle at the point of destination based on present vehicle position, latitude of destination entering means, trigonometric calculating means having as inputs thereto; said latitude of destination entering means, said distance remaining to be traveled output and said course angle at destination based on present vehicle position output and having as an output thereof a shaft position representative of course angle at present vehicle position, compass heading entering means, drift entering means, summation means operative by said compass heading entering means and said drift entering means producing an output indicative of actual course heading at present vehicle position, subtractive means operative by the output of said last mentioned summation means and the output of said trigonometric calculating means to produce an output proportional to the instantaneous deviation from a great circle course drawn from present vehicle position to the point of known destination, indicating means operated by said last mentioned output, and means operated by said last mentioned output for deriving trigonometric functions thereof connected between said speed entering means and the inputs of said first and second integrators.

4. A navigator for continuously indicating the proper heading of a vehicle in traversing a great circle course over the earth's surface from a known point of departure to a known point of destination comprising, speed entering means, a first integrator having impressed thereon a function derived from said speed entering means, distance entering means for entering the calculated great circle distance between the known point of departure and said known point of destination, subtractive means operative by the output of said first integrator and said distance entering means producing an output indicative of the distance remaining to be traveled, an indicator operated thereby, a second integrator including a feedback circuit, means for impressing a function of said speed entering means on the input thereof, means for impressing the sine function of the output of said subtractive means in said feedback circuit whereby the output of said second integrator is the integral of the quotient of the function of the speed entering means impressed on its input and the sine function of the output of said subtractive means, course angle entering means for entering the calculated initial course angle at the point of destination, summation means operative by said course angle entering means and the output of said second integrator producing an output indicative of the course angle at the point of destination based on the great circle course from present vehicle position to destination, latitude of destination entering means, trigonometric calculating means having as inputs thereto; said latitude of destination entering means, said distance remaining to be traveled output and said course angle at destination based on present vehicle position output and having as an output thereof a first shaft position representative of the course angle of the vehicle at its present position, compass heading entering means, drift entering means, summation means operative by said compass heading entering means and said drift entering means producing an output second shaft position indicative of actual course heading at present vehicle position, subtractive means operative by said first and second shaft positions producing an output shaft position proportioned to the deviation from a great circle course to destination, indicating means operative by said last mentioned shaft position, means operated by said last mentioned shaft position for deriving the cosine function thereof connected between said speed entering means and said first integrator whereby the function of the speed entering means impressed on said first integrator is the speed multiplied by the cosine of the deviation from great circle course, and means operative by said last mentioned shaft position for deriving the sine function thereof connected between said speed entering means and said second integrator whereby the function of the speed entering means impressed on the input of said second integrator is the speed multiplied by the sine of the deviation from great circle course.

5. A navigator for continuously indicating the proper heading of a vehicle in traversing a great circle course over the earth's surface from a known point of departure to a known point of destination comprising, speed entering means, a first integrator having impressed thereon a function derived from said speed entering means, distance entering means for entering the calculated great circle distance between the known point of departure and said known point of destination, subtractive means operative by the output of said first integrator and said distance entering means producing an output indicative of the distance remaining to be traveled, an indicator operated thereby, a second integrator including a feedback circuit, means for impressing a function of said speed entering means on the input thereof, means for impressing the sine function of the output of said subtractive means in said feedback circuit whereby the output of said second integrator is the integral of the quotient of the function of the speed entering means impressed on its input and the sine function of the output of said subtractive means, course angle entering means for entering the calculated initial course angle at the point of destination, summation means operative by said course angle entering means and the output of said second integrator producing an output indicative of the course angle at the point of destination based on the great circle course from present vehicle position to destination, latitude of destination entering means, resolving means having as inputs thereto, said latitude of destination entering means, said distance remaining to be traveled output and said course angle at destination based on present vehicle position output for producing as a first output the product, $\cos L_B \sin B$, and as a second output the function, $\sin L_B \sin D - \cos L_B \cos B \cos D$; where $L_B$ is the latitude of destination, D is the distance remaining to be traveled and B is the course angle at destination based on present vehicle position, arc-tangent resolving means having said first and second outputs impressed thereon and producing as an output thereof a first shaft position representative of the course angle of the vehicle at its present position, compass heading entering means, drift entering means, summation means operative by said compass heading entering means and said drift entering means producing an output second shaft position indicative of actual course heading at present vehicle position, subtractive means operative by said first and second shaft positions producing an output shaft position proportioned to the deviation from a great circle course to destination, indicating means operative by said last mentioned shaft position, means operated by said last mentioned shaft position for deriving the cosine function thereof connected between said speed entering means and said first integrator whereby the function of the speed entering means impressed on said first integrator is the speed multiplied by the cosine of the deviation from great circle course, and means operative by said last mentioned shaft position for deriving the sine function thereof connected between said speed entering means and said second integrator whereby the function of the speed entering means impressed on the input of said second integrator is the speed multiplied by the sine of the deviation from great circle course.

6. A navigator for continuously indicating the proper heading of a vehicle in traversing a great circle course over the earth's surface from a known point of departure to a known point of destination comprising, speed entering means, means for obtaining the product of the speed entered by said speed entering means and a trignometric function of any deviation from a great circle course between the present position of the vehicle and the known point of destination, first integrating means for integrating said product and producing as an output an indication of the distance traveled, distance entering means for entering the calculated great circle distance between the point of departure and the point of destination, subtractive means operative by said distance entering means and said distance traveled output producing as an output an indication of the distance remaining to be traveled to reach said point of destination, dividing means actuated by a trigonometric function of any deviation from a great circle course from the present position of the vehicle to the known point of destination and a trigonometric function of said distance remaining to be traveled output to produce an output quotient, second integrating means integrating said quotient producing as an output an indication of the change in course angle at the point of destination, entering means for entering the initial calculated course angle of the point of destination, summation means operative by the initial course angle entering means and the change in course angle output producing as an output an indication of the course angle at the point of destination based on present vehicle position, latitude of destination entering means, trigonometric calculating means operative by said latitude of destination entering means, said course angle based on present vehicle position output and said distance remaining to be traveled output for producing an output indicative of the true course angle at present vehicle position, compass heading entering means, drift entering means, summation means operated by said compass heading entering means and said drift entering means producing as an output an indication of actual course heading at present vehicle position, subtractive means operative by said true course angle output and said actual course angle output producing an output indicative of the deviation from a great circle course from present position to the point of known destination and means for indicating said deviation.

7. A navigator for continuously indicating the proper heading of a vehicle in traversing a great circle course over the earth's surface from a known point of departure to a known point of destination comprising, speed entering means, first multiplying means for obtaining the product of the speed entered by said speed entering means and a trigonometric function of any deviation from a great circle course extending from present vehicle position to the known point of destination, first integrating means for integrating said product and producing as an output an indication of the distance traveled, distance entering means for entering the calculated great circle distance between the point of departure and the point of destination, subtractive means operated by said distance entering means and said distance traveled output producing as an output an indication of the distance remaining to be traveled to the point of destination, a second integrating means including a feedback circuit, second multiplying means for obtaining the product of said speed entering means and a trigonometric function of any deviation from great circle course extending from present vehicle position to the known point of destination, means for impressing said product on the input of said second integrator, means for producing an output which is the sine of the distance remaining to be traveled and for impressing said output in said feedback circuit whereby the output of said second integrator constitutes an indication of the change in course angle at the point of destination as a result of deviation from planned course, entering means for entering the initial calculated course angle at the point of destination, summation means operative by the initial course angle entering means and the change in course angle output producing as the sum an output which constitutes an indication of the course angle at the point of destination based on present vehicle position, latitude of destination entering means, trigonometric calculating means operated by said latitude of destination entering means, said output indicative of the course angle at destination based on present vehicle position and said output indicative of said distance remaining to be traveled for producing as an output an indication of the true course angle of the vehicle at its present position, compass heading entering means, drift entering means, summation means operated by said compass heading entering means and said drift entering means producing an output indicative of actual course heading of the vehicle, subtractive means operated by said output indicative of true course angle and said output indicative of actual course angle to produce an output indicative of deviation from great circle course extending from present vehicle position to the known point of destination, means for indicating said output, means for obtaining the cosine of said output and for regeneratively applying the cosine of the output to said first multiplying means whereby the trigonometric function by which the speed entering means is multiplied is the cosine of the deviation from great circle course and means for obtaining the sine of said deviation output and for regeneratively applying the sine of the output to said second multiplying means whereby the trigonometric function by which the speed entering means is multiplied is the sine of the deviation from great circle course.

8. A navigator for continuously indicating the proper heading of a vehicle in traversing a great circle course over the earth's surface from a known point of departure to a known point of destination comprising, speed entering means, first multiplying means for obtaining the product of the speed entered by said speed entering means and a trigonometric function of any deviation from a great circle course extending from present vehicle position to the known point of destination, first integrating means for integrating said product and producing as an output an indication of the distance traveled, distance entering means for entering the calculated great circle distance between the point of departure and the point of destination, subtractive means operated by said distance entering means and said distance traveled output producing as an output an indication of the distance remaining to be traveled to the point of destination, a second integrating means including a feedback circuit, second multiplying means for obtaining the product of said speed entering means and a trigonometric function of any deviation from great circle course extending from present vehicle position to the known point of destination, means for impressing said product on the input of said second integrator, means for producing an output which is the sine of the distance remaining to be traveled and for impressing said output in said feedback circuit whereby the output of said second integrator constitutes an indication of the change in course angle at the point of destination as a result of deviation from planned course, entering means for entering the initial calculated course angle at the point of destination, summation means operative by the initial course angle entering means and the change in course angle output producing as the sum an output which constitutes an indication of the course angle at the point of destination based on present vehicle position, latitude of destination entering means, resolving means having as inputs thereto, said latitude of destination entering means, said output indicative of distance remaining to be traveled and said output indicative of said course angle at destination based on present vehicle position for producing as a first output the product $\cos L_B \sin B$, and as a second output the function $\sin L_B \sin D - \cos L_B \cos B \cos D$, where $L_B$ is the latitude of destination, $D$ is the distance remaining to be traveled and $B$ is the course angle at destination based on present vehicle position, arc-tangent resolving means having said first and second outputs impressed thereon and producing therefrom an output indicative of the true course angle of the vehicle at its present position, compass heading entering means, drift entering means, summation means operated by said compass heading entering means and said drift entering means producing an output indicative of actual course heading of the vehicle, subtractive means operated by said output indicative of true course angle and said output indicative of actual course angle to produce an output indicative of deviation from great circle course extending from present vehicle position to the known point of destination, means for indicating said output, means for obtaining the cosine of said output and for regeneratively applying the cosine of the output to said first multiplying means whereby the trigonometric function by which the speed entering means is multiplied is the cosine of the deviation from great circle course and means for obtaining the sine of said deviation output and for regeneratively applying the sine of the output to said second multiplying means whereby the trigonometric function by which the speed entering means is multiplied is the sine of the deviation from great circle course.

9. A navigator for continuously indicating the proper heading of a vehicle in traversing a great circle course over the earths's surface from a known point of departure to a known point of destination and for continuously indicating present latitude and present longitude during such journey comprising, speed entering means, a first integrator having impressed thereon a function of the speed entered by said speed entering means, distance entering means for entering the calculated great circle distance between the point of departure and the point of destination, subtractive means operated by the output of said first integrator and said distance entering means producing an output indicative of the distance remaining to be traveled, an indicator operated thereby, a second integrator including a feedback circuit, means for impressing a function of said speed entering means on the input thereof and means for impressing a trigonometric function of the output of said subtractive means in the feedback circuit whereby the output of said second integrator is the integral of the quotient of said functions, course angle entering means for entering the calculated initial course angle at the point of destination, summation means operative by said course angle entering means and the output of said second integrator producing an output indicative of the course angle at the point of destination based on present vehicle position, latitude of destination entering means, a first trigonometric calculating means operative by said latitude of destination entering means, said distance remaining to be traveled output and said course angle at destination based on present vehicle position output producing therefrom an output indicative of the true course angle of the vehicle at its present position, compass heading entering means, drift entering means, algebraic summation means operative by said compass heading entering means, said drift entering means and the output of said first trigonometric calculating means producing an output indicative of the deviation from true great circle course, an indicator operated by said last mentioned output, a regenerative connection including trigonometric function deriving means operated by said last mentioned output connected between said speed entering means and said first and second integrators, a second trigonometric calculating means having as inputs thereto said latitude of destination entering means, said distance remaining to be traveled output and said course angle at destination based on present vehicle position output, producing therefrom an output indicative of the polar angle between present vehicle position and point of destination, longitude of destination entering means, summation means operative by said longitude of destination means and said polar angle output to produce an output indicative of the present longitude of said vehicle, an indicator for indicating said longitude and third trigonometric calculating means operative by outputs derived from said second trigonometric calculator producing an output indicative of the present latitude of said vehicle and indicating means operated by said last mentioned output.

10. A navigator for continuously indicating the proper heading of a vehicle in traversing a great circle course over the earth's surface from a known point of departure to a known point of destination and for continuously indicating present longitude and present latitude of the vehicle during such journey comprising, speed entering means, a first integrator having impressed thereon a function of the speed entered by said speed entering means, distance entering means for entering the calculated great circle distance between the point of departure and the point of destination, subtractive means operated by the output of said first integrator and said distance entering means producing an output indicative of the distance remaining to be traveled, an indicator operated thereby, a second integrator including a feedback circuit, means for impressing a function of said speed entering means on the input thereof, means for impressing the sine of the output of said subtractive means in the feedback circuit whereby the output of said second integrator is the integral of the quotient of said inputs, course angle entering means for entering the calculated initial course angle at the point of destination, summation means operative by said course angle entering means and the output of said second integrator producing an output indicative of the course angle at the point of destination based on present vehicle position, latitude of destination entering means, a first trigonometric calculating means having as inputs thereto said latitude of destination entering means, said distance remaining to be traveled output and said course angle at destination based on present vehicle position output producing therefrom an output indicative of the true course angle of the vehicle at its present position, compass heading entering means, drift entering means, algebraic summation means operative by said compass heading entering means, said drift entering means and the output of said first trigonometric calculating means producing an output indicative of the deviation from true great circle course, an indicator operated by said last mentioned output, a regenerative connection between said output indicative of deviation from true great circle course and the inputs of said first and second integrators, said regenerative connection including means for deriving the cosine of said deviation inserted in the input of said first integrator whereby the trigonometric function of said speed entering means impressed on said first integrator is the cosine of said deviation, said regenerative circuit further including means for deriving the sine of said deviation inserted in the input of said second integrator whereby the function of said speed entering means impressed on the input of said second integrator is multiplied by the sine of said deviation, a second trigonometric calculating means having as inputs thereto said latitude of destination entering means said distance remaining to be traveled output and said course angle at destination based on present vehicle position output producing therefrom an output indicative of the polar angle between present vehicle position and point of destination, longitude of destination entering means, summation means operative by said longitude of destination entering means of said polar angle output to produce an output indicative of the present longitude of said vehicle, an indicator for indicating said longitude, and third trigonometric calculating means operative by signals derived from said second trigonometric calculator producing an output indicative of the present latitude of said vehicle and indicating means operated by said last mentioned output.

11. A navigator for continuously indicating the proper heading of a vehicle in traversing a great circle course over the earth's surface from a known point of departure to a known point of destination comprising, speed entering means, first integrating means operated by said speed entering means, distance entering means for entering the calculated great circle distance between the point of departure and the point of destination, means operated conjointly by said distance entering means and the output of said first integrator producing an output indicative of the distance remaining to be traveled, an indicator operated by said output, a second integrator operated conjointly by said speed entering means and said distance remaining to be traveled output, course angle entering means for entering the calculated initial course angle at the destination, means operated conjointly by said course angle entering means and the output of said second integrator producing an output indicative of the course angle at destination based on present vehicle position, latitude of destination entering means, trigonometric resolving means operated conjointly by said latitude of destination entering means, said output indicative of distance remaining to be traveled and said output indicative of course angle at destination based on present vehicle position, producing therefrom an output indicative of true course angle, compass heading entering means, drift entering means, means operative conjointly by said true course angle output, said compass heading entering means and said drift entering means producing as an output an indication of the deviation from true great circle course, an indicator operated by said deviation output and a regenerative connection between said deviation output and the inputs of said first and second integrating means whereby any deviation error is constantly entered.

12. A navigator for continuously indicating the proper heading of a vehicle in traversing a great circle course over the earth's surface from a known point of departure to a known point of destination comprising, speed entering means, first integrating means operated by said speed entering means, distance entering means for entering the calculated great circle distance between the point of departure and the point of destination, means operated conjointly by said distance entering means and the output of said first integrator producing an output indicative of the distance remaining to be traveled, an indicator operated by said output, a second integrator operated conjointly by said speed entering means and said distance remaining to be traveled output, course angle entering means for entering the calculated initial course angle at the destination, means operated conjointly by said course angle entering means and the output of said second integrator producing an output indicative of the course angle at destination based on present vehicle position, latitude of destination entering means, resolving means operated conjointly by said latitude of destination entering means, said output indicative of distance remaining to be traveled and said output indicative of course angle at destination based on present vehicle position producing as a first output the product, $\cos L_B \sin B$, and as a second output the function, $\sin L_B \sin D - \cos L_B \cos B \cos D$: where $L_B$ is the latitude of destination, D is the distance remaining to be traveled and B is the course angle at destination based on present vehicle position, arc-tangent resolving means conjointly operated by said first and second outputs producing an output indicative of true course angle, compass heading entering means, drift entering means, means operative conjointly by said true course angle output, said compass heading entering means and said drift entering means producing as an output an indication of the deviation from true great circle course, an indicator operated by said deviation output and a regenerative connection between said deviation output and the inputs of said first and second integrating means whereby any deviation error is constantly entered.

13. A navigator for continuously indicating the proper heading of a vehicle in traversing a great circle course over the earth's surface from a known point of departure to a known point of destination and for continuously indicating present longitude and present latitude of the vehicle during such journey comprising, speed entering means, first integrating means operated by said speed entering means, distance entering means for entering the calculated great circle distance between the point of departure and the point of destination, means operated conjointly by said distance entering means and the output of said first integrator producing an output indicative of the distance remaining to be traveled, an indicator operated by said output, a second integrator operated conjointly by said speed entering means and said distance remaining to be traveled output, course angle entering means for entering the initial course angle at the destination, means operated conjointly by said course angle entering means and the output of said second integrator producing an output indicative of the course angle at destination based on present vehicle position, latitude of destination entering means, first trigonometric resolving means operated conjointly by said latitude of destination entering means, said output indicative of distance remaining to be traveled and said output indicative of course angle at destination based on present vehicle position producing therefrom an output indicative of true course angle, compass heading entering means, drift entering means, means operative conjointly by said true course angle output, said compass heading entering means and said drift entering means producing as an output an indication of the deviation from true great circle course, an indicator operated by said deviation output, a regenerative connection between said deviation output and the inputs of said first and second integrating means whereby any deviation error is constantly entered, second trigonometric resolving means conjointly operated by said latitude of destination entering means, said distance remaining to be traveled output and said course angle at destination based on present vehicle position output producing therefrom an output indicative of the polar angle between present vehicle position and the point of destination, longitude of destination entering means, means operated conjointly by said longitude of destination entering means and said polar angle output producing an output indicative of the present longitude of said vehicle, third trigonometric resolving means operative by signals derived from said second trigonometric calculator producing an output indicative of the present latitude of said vehicle and indicating means operated by said last mentioned output.

No references cited.